(12) United States Patent
Shiwa et al.

(10) Patent No.: US 11,335,363 B2
(45) Date of Patent: May 17, 2022

(54) TONEARM DEVICE AND REPRODUCTION DEVICE

(71) Applicant: PANASONIC INTELLECTUAL PROPERTY MANAGEMENT CO., LTD., Osaka (JP)

(72) Inventors: Masayuki Shiwa, Osaka (JP); Tomoyuki Yamashiro, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/276,456

(22) PCT Filed: Sep. 17, 2019

(86) PCT No.: PCT/JP2019/036429
§ 371 (c)(1),
(2) Date: Mar. 15, 2021

(87) PCT Pub. No.: WO2020/137030
PCT Pub. Date: Jul. 2, 2020

(65) Prior Publication Data
US 2022/0036917 A1 Feb. 3, 2022

(30) Foreign Application Priority Data
Dec. 27, 2018 (JP) .............................. JP2018-244606

(51) Int. Cl.
*G11B 3/085* (2006.01)
(52) U.S. Cl.
CPC ............................... *G11B 3/08503* (2013.01)

(58) Field of Classification Search
None
See application file for complete search history.

(56) References Cited

U.S. PATENT DOCUMENTS 3,717,350 A * 2/1973 Oakley .................... G11B 3/09
3,973,777 A * 8/1976 Guha ....................... G11B 3/08
369/246

(Continued)

FOREIGN PATENT DOCUMENTS

CN 213366136 U * 6/2021
EP 0168106 A1 * 1/1986

(Continued)

OTHER PUBLICATIONS

International Search Report and Written Opinion dated Nov. 19, 2019 in International Patent Application No. PCT/JP2019/036429; with partial English translation.

*Primary Examiner* — William J Klimowicz
(74) *Attorney, Agent, or Firm* — McDermott Will & Emery LLP

(57) ABSTRACT

A lifter mechanism includes: a first lifter; a second lifter; a first biasing member that biases the second lifter from a second lower limit position toward a second upper limit position; a locking lever that is displaced between a locked position in which the locking lever locks the second lifter in the second lower limit position and a released position in which the locking lever releases the lock of the second lifter from the second lower limit position; a second biasing member that biases the locking lever from the locked position toward the released position; a holding member that holds the locking lever in the locked position; and a queueing lever that pushes down the second lifter from the second upper limit position to the second lower limit position.

8 Claims, 17 Drawing Sheets

(56) References Cited

U.S. PATENT DOCUMENTS

| | | | | |
|---|---|---|---|---|
| 4,004,817 A * | 1/1977 | Shimoda | ............... | G11B 3/32 |
| | | | | 369/244.1 |
| 4,046,385 A * | 9/1977 | Hunt | ............... | G11B 3/08 |
| | | | | 369/216 |
| 8,576,687 B1 * | 11/2013 | Schroder | ............... | G11B 3/34 |
| | | | | 369/255 |
| 2020/0058321 A1 * | 2/2020 | Yamashiro | ............... | G11B 3/60 |
| 2022/0036917 A1 * | 2/2022 | Shiwa | ............... | G11B 3/32 |

FOREIGN PATENT DOCUMENTS

| | | | | |
|---|---|---|---|---|
| GB | 2566501 A * | 3/2019 | ............... | G11B 3/06 |
| JP | S58-060370 U | 4/1983 | | |
| JP | S58-114557 U | 8/1983 | | |
| JP | S59-130209 U | 9/1984 | | |
| JP | S64-001842 B2 | 1/1989 | | |
| JP | 2018106793 A * | 7/2018 | ............... | G11B 3/08 |
| WO | WO-2018123232 A1 * | 7/2018 | ............... | G11B 3/08 |

* cited by examiner

TONEARM DEVICE AND REPRODUCTION DEVICE

CROSS-REFERENCE OF RELATED APPLICATIONS

This application is the U.S. National Phase under 35 U.S.C. § 371 of International Patent Application No. PCT/JP2019/036429, filed on Sep. 17, 2019, which in turn claims the benefit of Japanese Application No. 2018-244606, filed on Dec. 27, 2018, the entire disclosures of which Applications are incorporated by reference herein.

TECHNICAL FIELD

The present disclosure relates to tonearm devices and reproduction devices including the same.

BACKGROUND ART

Reproduction devices which play phonograph records (analog discs) are known. A tonearm device for picking up an audio signal from a phonograph record is mounted in a reproduction device (for example, refer to Patent Literature (PTL) 1). The tonearm device includes an arm base, an arm rotatably supported on the arm base, and a lifter mechanism which rotates the arm downward and upward. The lifter mechanism includes a motor disposed outside the arm base and a mounting pedestal which supports the arm from below and is raised and lowered with the drive force of an electric motor. The arm rotates upward in conjunction with upward movement of the mounting pedestal and rotates downward in conjunction with downward movement of the mounting pedestal.

A cartridge including a record needle is detachably attached to the tip portion of the arm. To play a phonograph record, the mounting pedestal is lowered and the arm is rotated downward, and thus the tip portion of the arm approaches the phonograph record and the record needle contacts the face of the phonograph record. To stop the playing of the phonograph record, the mounting pedestal is raised and the arm is rotated upward, and thus the tip portion of the arm is detached from the phonograph record.

CITATION LIST

Patent Literature

PTL 1: Japanese Unexamined Utility Model Application Publication No. S58-114557

SUMMARY OF THE INVENTION

Technical Problem

The present disclosure provides a tonearm device in which a lifter mechanism can be downsized, and a reproduction device including the same.

Solution to Problem

A tonearm device according to the present disclosure is used in a reproduction device for playing a phonograph record and includes: an arm that has a tip portion to which a cartridge is attached and that is supported to be rotatable downward to move the tip portion toward the phonograph record and be rotatable upward to move the tip portion away from the phonograph record; and a lifter mechanism that rotates the arm downward and upward. The lifter mechanism includes: a first lifter that supports the arm from below and is raised and lowered between a first lower limit position and a first upper limit position located higher than the first lower limit position; a second lifter that supports the first lifter from below and is raised and lowered between a second lower limit position and a second upper limit position located higher than the second lower limit position; a first biasing member that biases the second lifter from the second lower limit position toward the second upper limit position; a locking lever that is displaced between a locked position in which the locking lever locks the second lifter in the second lower limit position and a released position in which the locking lever releases the lock of the second lifter from the second lower limit position; a second biasing member that biases the locking lever from the locked position toward the released position; a holding member that holds the locking lever in the locked position; and a queueing lever that pushes down the second lifter from the second upper limit position to the second lower limit position. When the holding member releases the hold of the locking lever from the locked position, the locking lever is displaced from the locked position to the released position by a biasing force of the second biasing member, the second lifter is raised from the second lower limit position to the second upper limit position by a biasing force of the first biasing member, the first lifter is raised from the first lower limit position to the first upper limit position in conjunction with upward movement of the second lifter, and the arm rotates upward in conjunction with upward movement of the first lifter. When the queueing lever pushes down the second lifter from the second upper limit position to the second lower limit position, the second lifter abuts the locking lever, the locking lever is displaced from the released position to the locked position, the first lifter is lowered from the first upper limit position to the first lower limit position, and the arm rotates downward in conjunction with downward movement of the first lifter.

Advantageous Effect of Invention

With the tonearm device, etc., according to the present disclosure, the lifter mechanism can be downsized.

DESCRIPTION OF EXEMPLARY EMBODIMENT

Underlying Knowledge Forming Basis of the Present Disclosure

The inventors of the present application found that the following problem occurs in the technique described in the BACKGROUND ART section.

In the above-described existing tonearm device, the electric motor for the lifter mechanism is relatively large in size and therefore cannot be stored in the arm base, but is disposed outside the arm base. This configuration, however, causes the problem of an increase in the size of the tonearm device.

Hereinafter, exemplary embodiments will be described in detail with reference to the drawings where appropriate. However, there are instances where overly detailed description will be omitted. For example, there are cases where detailed description of well-known matter or overlapping description of substantially identical elements will be omitted. This is in order to prevent the subsequent description from becoming overly verbose and to facilitate the understanding of a person having ordinary skill in the art.

Note that the accompanying drawings and the subsequent description have been provided by the inventors in order for a person having ordinary skill in the art to sufficiently understand the present disclosure, and thus they are not intended to limit the scope of the subject matter of the appended Claims.

Embodiment

An embodiment will be described below with reference to FIG. 1 to FIG. 17. In the present disclosure, the term "rising" means the upward movement (upward in FIG. 1) in the vertical direction, the term "lowering" means the downward movement (downward in FIG. 1) in the vertical direction, and the term "raising and lowering" means the upward and downward movement in the vertical direction.

[1-1. Overall Configuration of Reproduction Device]

Figure 1:
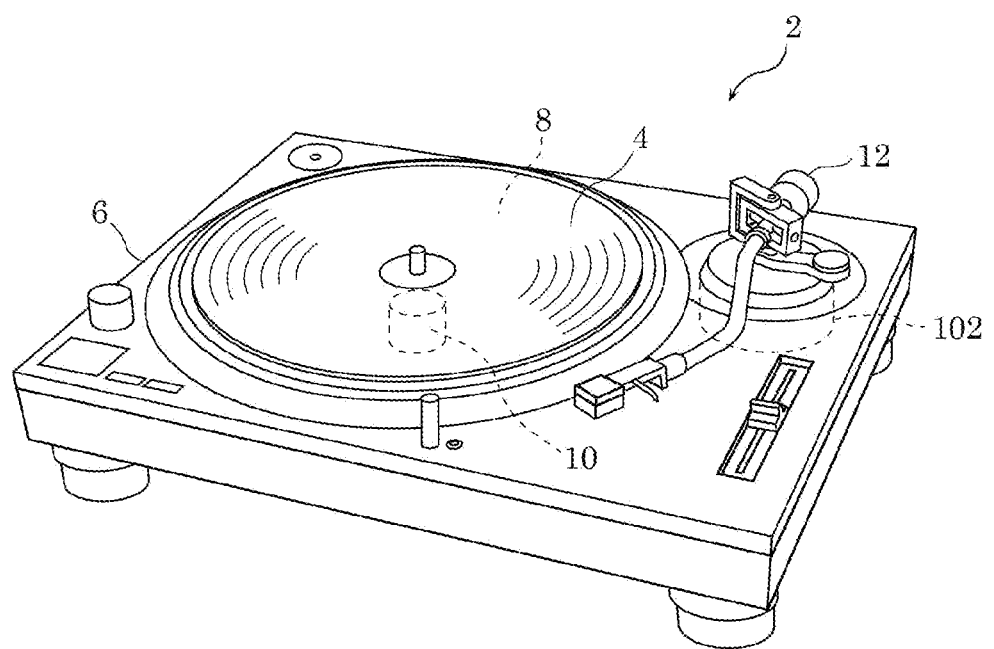
FIG. 1 is a perspective view illustrating a reproduction device according to an embodiment.

First, with reference to FIG. 1, the overall configuration of reproduction device 2 according to the embodiment will be described. FIG. 1 is a perspective view illustrating reproduction device 2 according to the embodiment.

As illustrated in FIG. 1, reproduction device 2 is a device (what is called a phonograph) for playing phonograph record 4. Reproduction device 2 includes casing 6, turntable 8, drive source 10, and tonearm device 12.

Casing 6 has the shape of a box approximately rectangular in plan view. Turntable 8 is a disc-shaped table for placing phonograph record 4 thereon and is rotatably supported on the topside of casing 6. Drive source 10 is a motor for rotating turntable 8 and is disposed inside casing 6.

Tonearm device 12 is for picking up an audio signal from phonograph record 4 placed on rotating turntable 8 and is disposed on the topside of casing 6, adjacent to turntable 8. Reproduction device 2 according to the present embodiment is characterized by the configuration of tonearm device 12. The configuration of tonearm device 12 will be described in detail below.

[2. Configuration of Tonearm Device]

[2-1. Overall Configuration of Tonearm Device]

Figure 2:
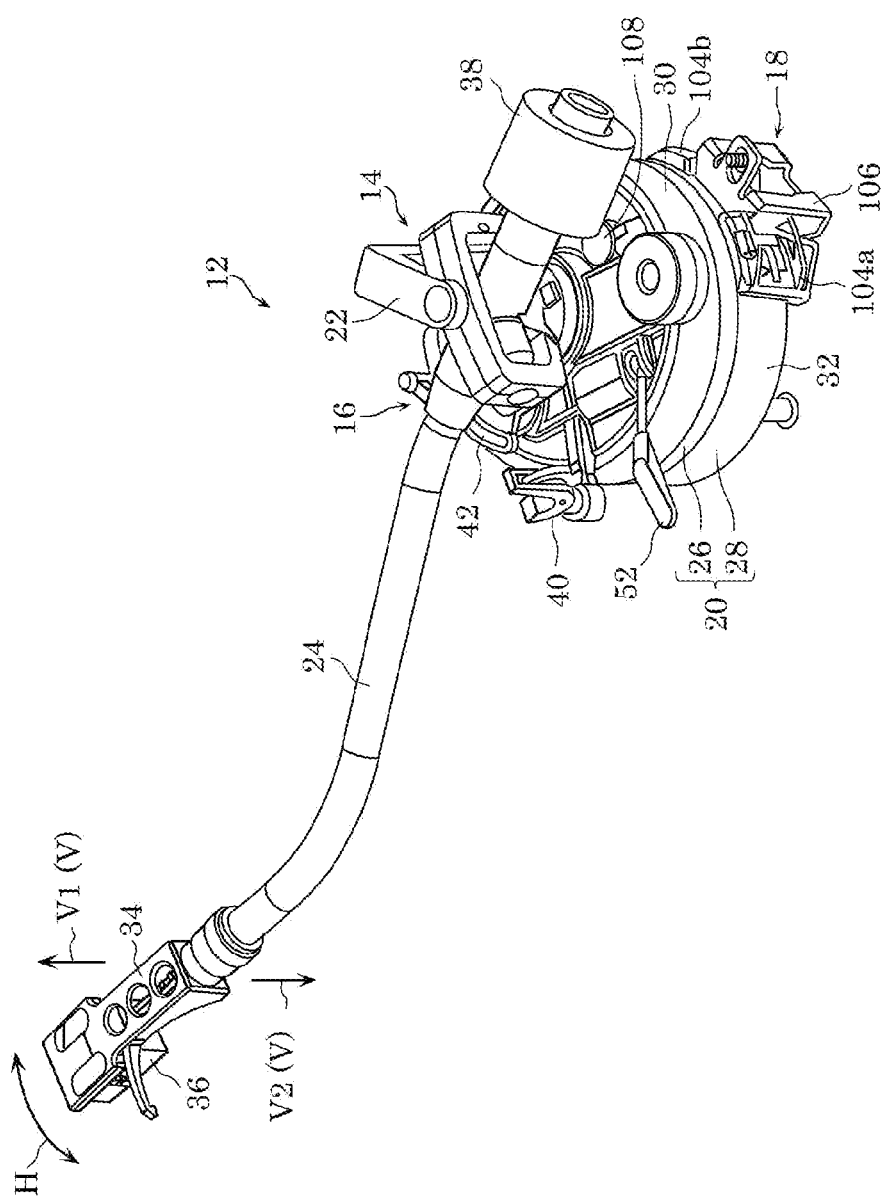
FIG. 2 is a perspective view illustrating a tonearm device according to an embodiment.
Figure 3:
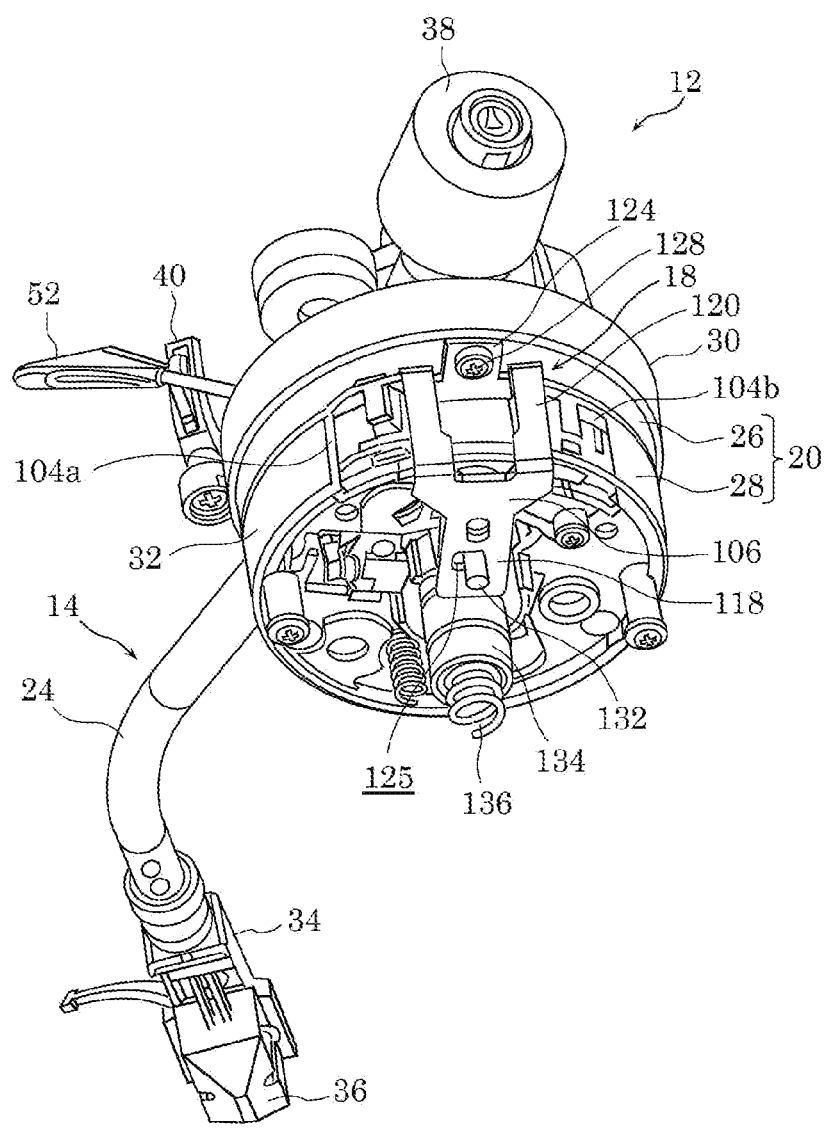
FIG. 3 is a perspective view illustrating a tonearm device according to an embodiment when viewed at an angle (from below) different from that in FIG. 2.

Next, with reference to FIG. 2 and FIG. 3, the overall configuration of tonearm device 12 according to the embodiment will be described. FIG. 2 is a perspective view illustrating tonearm device 12 according to the embodiment. FIG. 3 is a perspective view illustrating tonearm device 12 according to the embodiment when viewed at an angle (from below) different from that in FIG. 2.

As illustrated in FIG. 2 and FIG. 3, tonearm device 12 includes arm mechanism 14, lifter mechanism 16, and raising and lowering mechanism 18.

Arm mechanism 14 is for picking up an audio signal from phonograph record 4 placed on rotating turntable 8.

Lifter mechanism 16 is for rotating arm 24 (to be described later) of arm mechanism 14 upward and downward.

Raising and lowering mechanism 18 is for raising and lowering arm 24 of arm mechanism 14 with respect to phonograph record 4 on turntable 8.

Each of these structural elements of tonearm device 12 will be described in detail below.

[2-2. Configuration of Arm Mechanism]

The configuration of arm mechanism 14 will be described with reference to FIG. 2 and FIG. 3. As illustrated in FIG. 2 and FIG. 3, arm mechanism 14 includes arm base 20, rotating mechanism 22, and arm 24.

Arm base 20 is a member for supporting rotating mechanism 22, arm 24, etc., and is formed in the shape of a circle in plan view. Arm base 20 includes first supporting base 26 and second supporting base 28 attached to a lower end portion of first supporting base 26. Handle ring 30 is attached to the outer peripheral surface of first supporting base 26. Ring rubber 32 formed, for example, from a rubber material or the like is attached to the outer peripheral surface of second supporting base 28. Second supporting base 28 is supported on arm base mount 102 (refer to FIG. 1) (to be described later) in such a manner as to be capable of moving up and down. A user can raise and lower arm base 20 with respect to arm base mount 102 by holding handle ring 30 with his or her hand fingers.

Rotating mechanism 22 is for supporting arm 24 in such a manner as to allow supporting arm 24 to rotate horizontally and vertically and is disposed on the topside of first supporting base 26.

Arm 24 extends longitudinally as it bends into an approximate S-shape. Head-shell 34 is supported at the tip portion of arm 24. Cartridge 36 including a record needle is detachably attached to head-shell 34. Furthermore, balance weight 38 is supported at the proximal end portion of arm 24 to balance with the weight of head-shell 34 and cartridge 36. Arm 24 can rotate about rotating mechanism 22 as a rotation center along the face of phonograph record 4 (refer to FIG. 1) in the horizontal direction indicated by arrow H in FIG. 2. Furthermore, arm 24 can rotate about rotating mechanism 22 as a rotation center in the vertical direction indicated by arrow V in FIG. 2, specifically, upward as indicated by arrow V1 and downward as indicated by arrow V2.

Note that a user causes arm 24 to be supported by hook-shaped arm rest 40 placed on the topside of first supporting base 26 while phonograph record 4 is not played. In order to play phonograph record 4, a user detaches arm 24 from arm rest 40 and then places arm 24 on mounting pedestal 42 (to be described later) by rotating arm 24 horizontally and vertically.

[2-3. Lifter Mechanism]

[2-3-1. Configuration of Lifter Mechanism]

Figure 4:
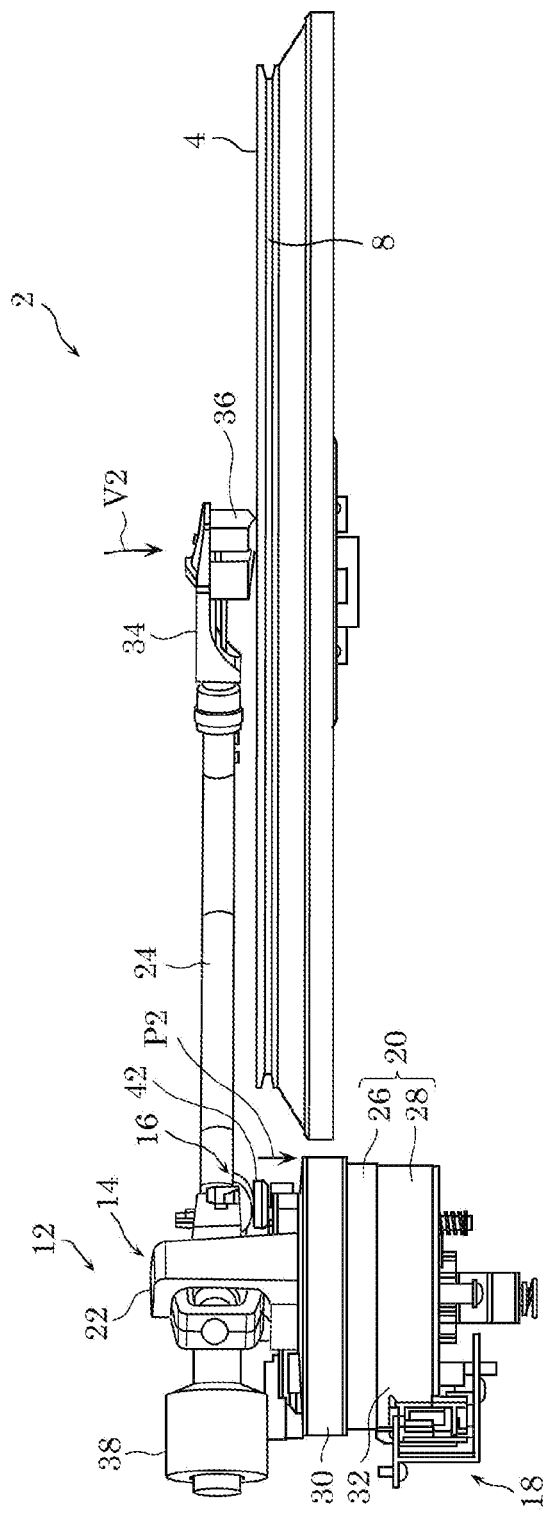
FIG. 4 is a side view illustrating the main part of a reproduction device according to an embodiment with an arm rotated downward.
Figure 5:
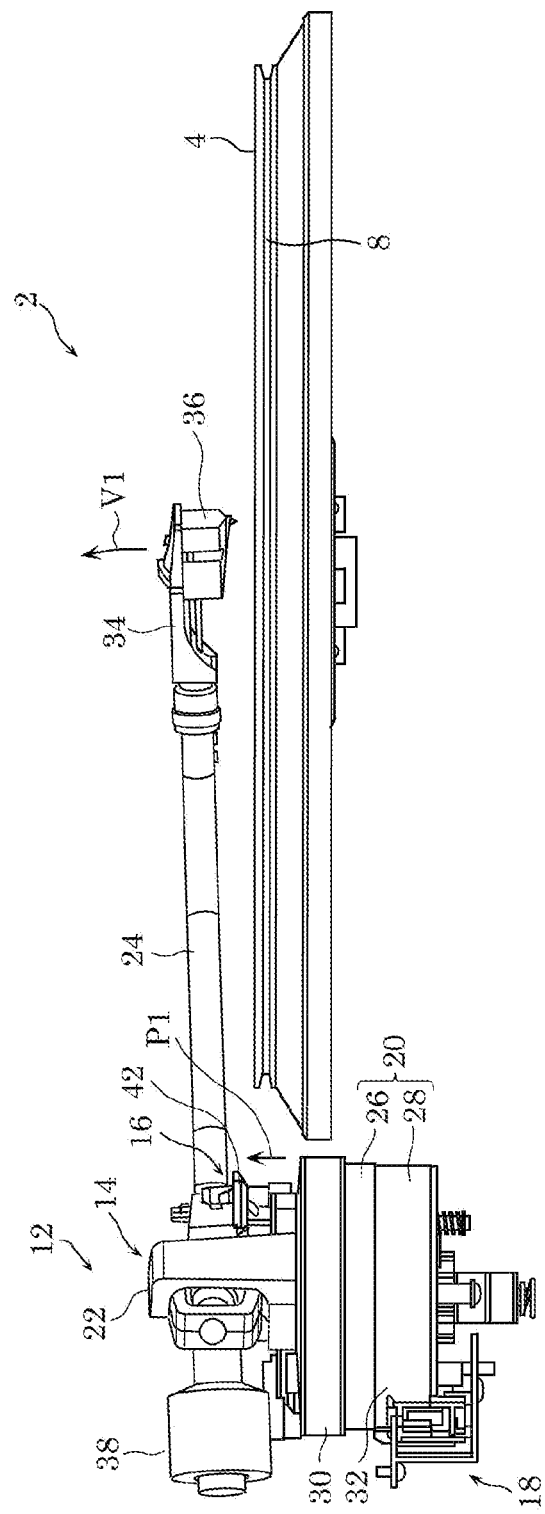
FIG. 5 is a side view illustrating the main part of a reproduction device according to an embodiment with an arm rotated upward.

Next, the configuration of lifter mechanism 16 will be described with reference to FIG. 4 to FIG. 13. FIG. 4 is a side view illustrating the main part of reproduction device 2 according to the embodiment with arm 24 rotated downward. FIG. 5 is a side view illustrating the main part of reproduction device 2 according to the embodiment with arm 24 rotated upward.

Figure 6:
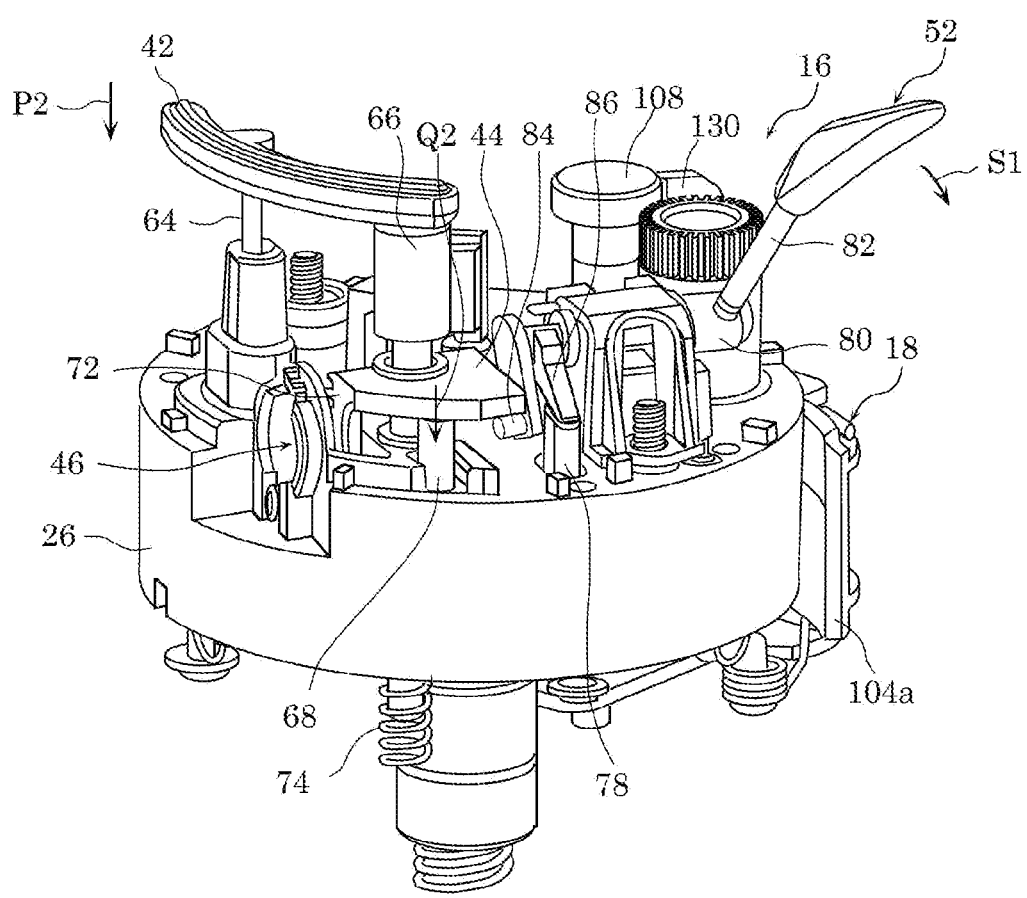
FIG. 6 is a perspective view illustrating a lifter mechanism according to an embodiment with a mounting pedestal in a raised position.
Figure 7:
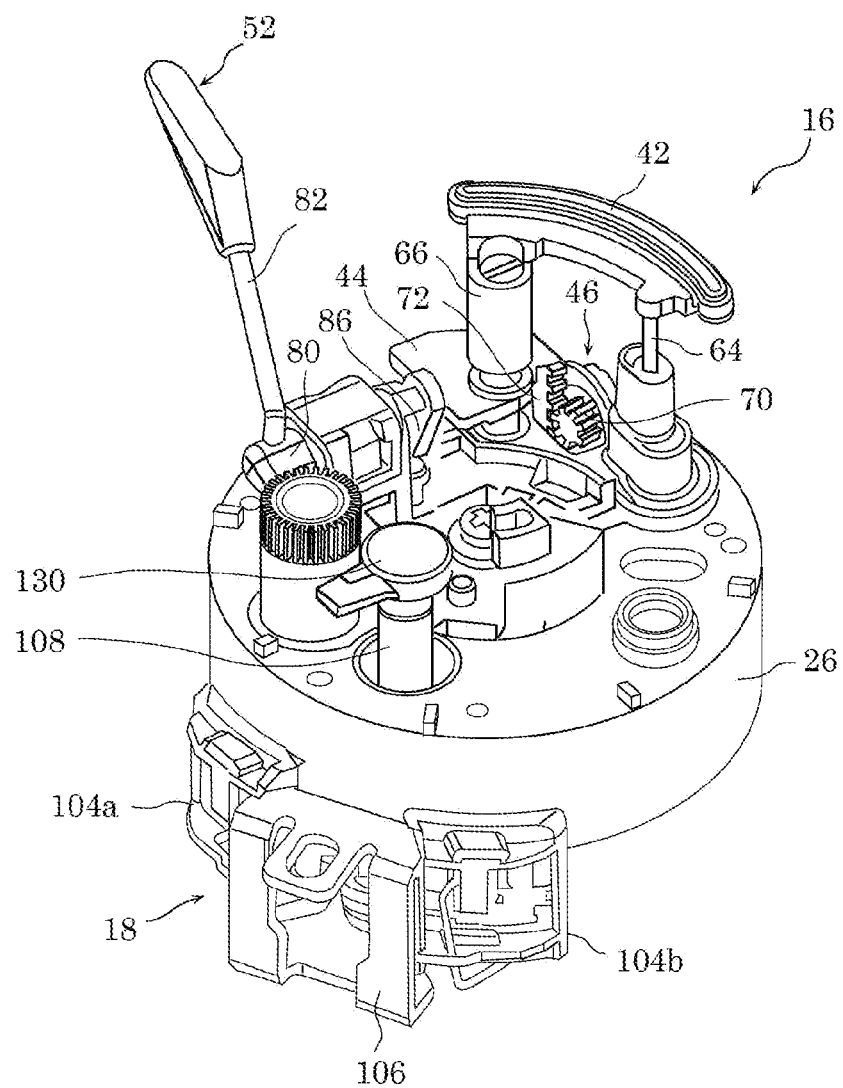
FIG. 7 is a perspective view illustrating a lifter mechanism according to an embodiment when viewed at an angle (from above) different from that in FIG. 6.
Figure 8:
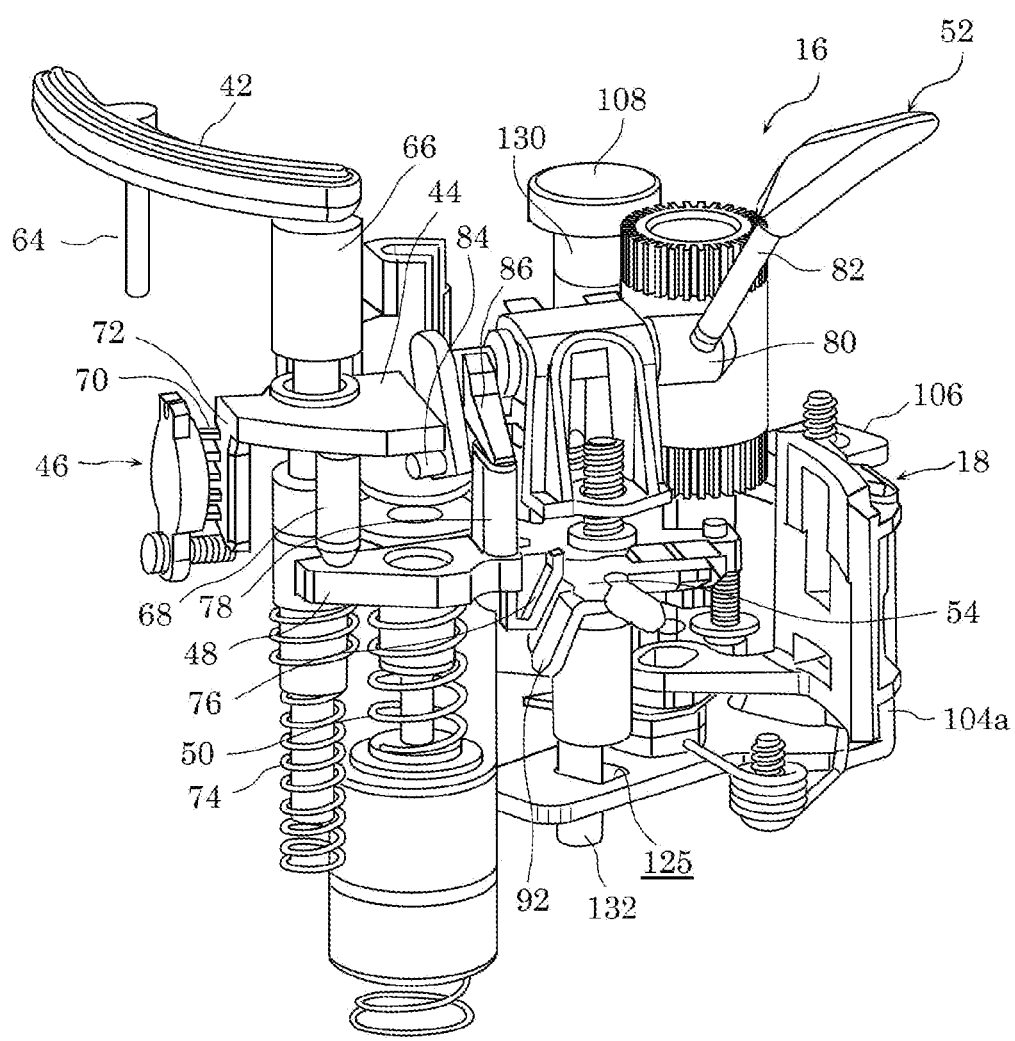
FIG. 8 is a perspective view illustrating a lifter mechanism according to an embodiment in the state where a first supporting base is omitted from FIG. 6.
Figure 9:
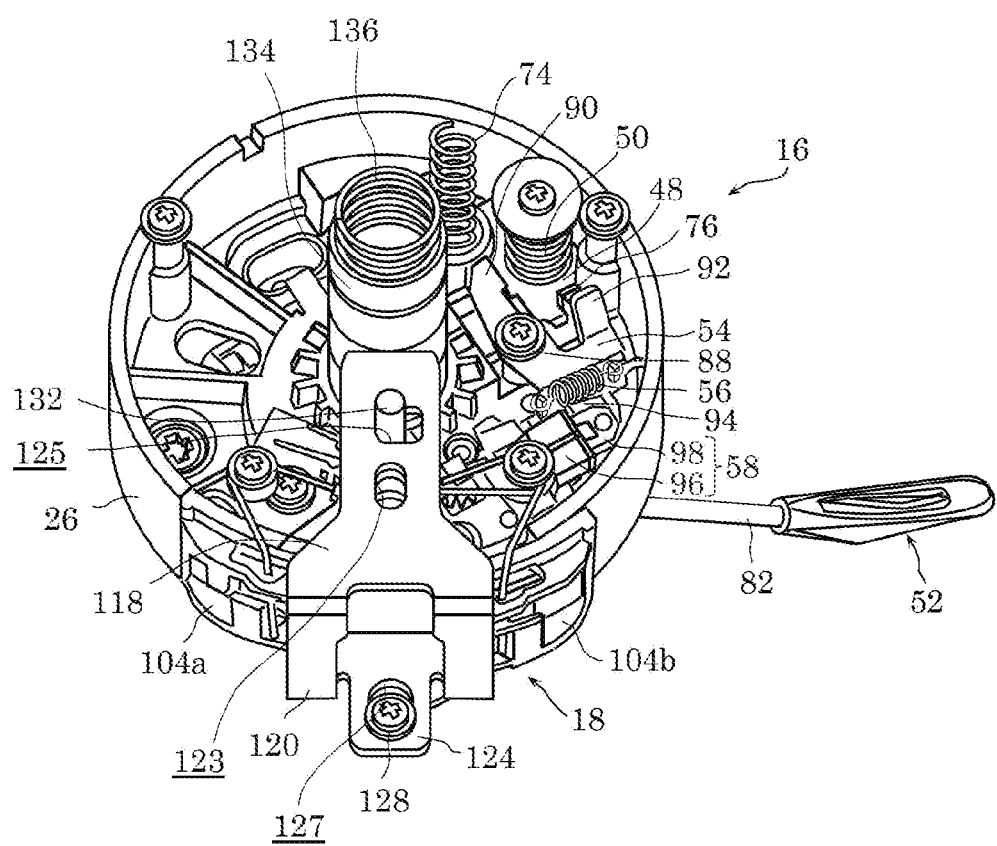
FIG. 9 is a perspective view illustrating a lifter mechanism according to an embodiment when viewed at an angle (from below) different from that in FIG. 6.
Figure 10:
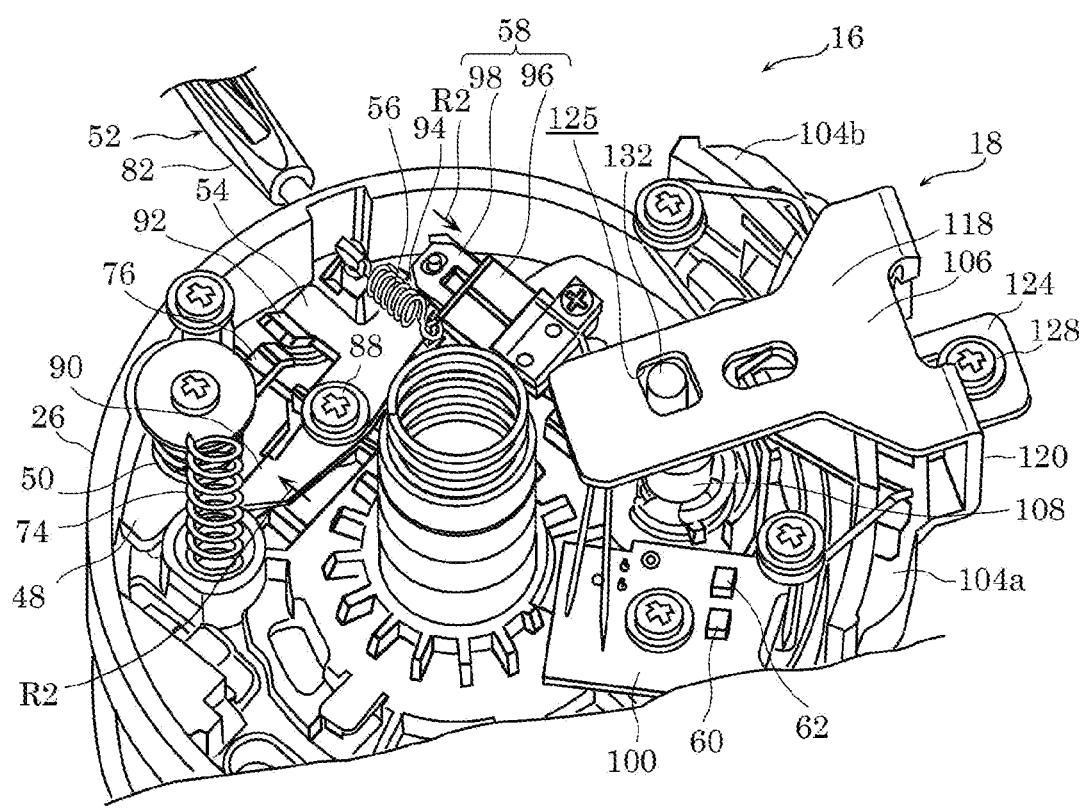
FIG. 10 is a partial enlarged view illustrating a lifter mechanism according to an embodiment when viewed at an angle (from below) different from that in FIG. 6.

FIG. 6 is a perspective view illustrating lifter mechanism 16 according to the embodiment with mounting pedestal 42 in a raised position. FIG. 7 is a perspective view illustrating lifter mechanism 16 according to the embodiment when viewed at an angle (from above) different from that in FIG. 6. FIG. 8 is a perspective view illustrating lifter mechanism 16 according to the embodiment in the state where first supporting base 26 is omitted from FIG. 6. FIG. 9 is a perspective view illustrating lifter mechanism 16 according to the embodiment when viewed at an angle (from below) different from that in FIG. 6. FIG. 10 is a partial enlarged view illustrating lifter mechanism 16 according to the embodiment when viewed at an angle (from below) different from that in FIG. 6.

Figure 11:
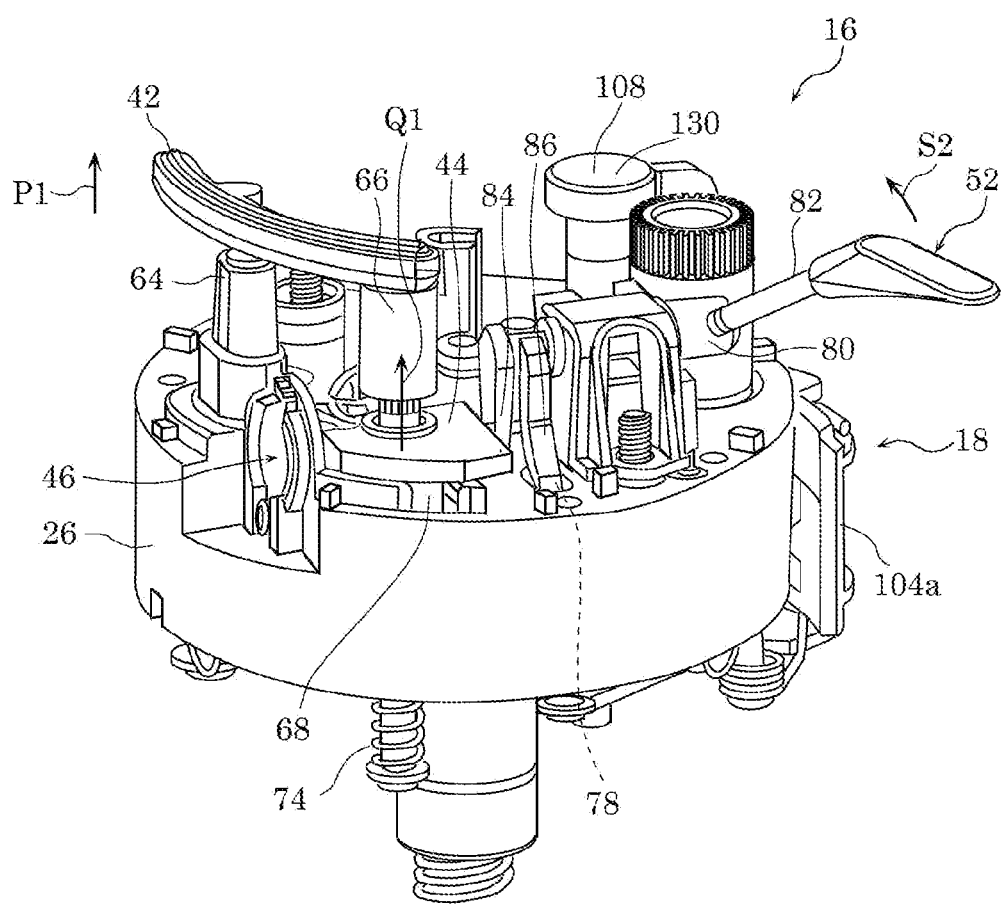
FIG. 11 is a perspective view illustrating a lifter mechanism according to an embodiment with a mounting pedestal in a lowered position.
Figure 12:
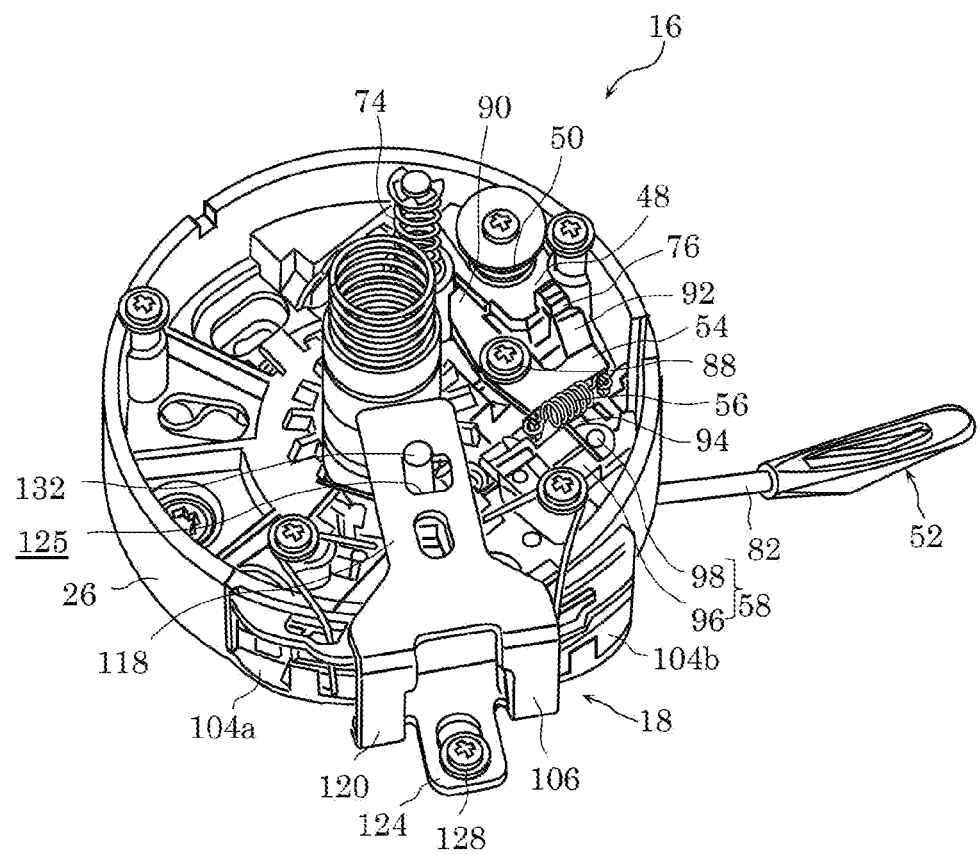
FIG. 12 is a perspective view illustrating a lifter mechanism according to an embodiment when viewed at an angle (from below) different from that in FIG. 11.
Figure 13:
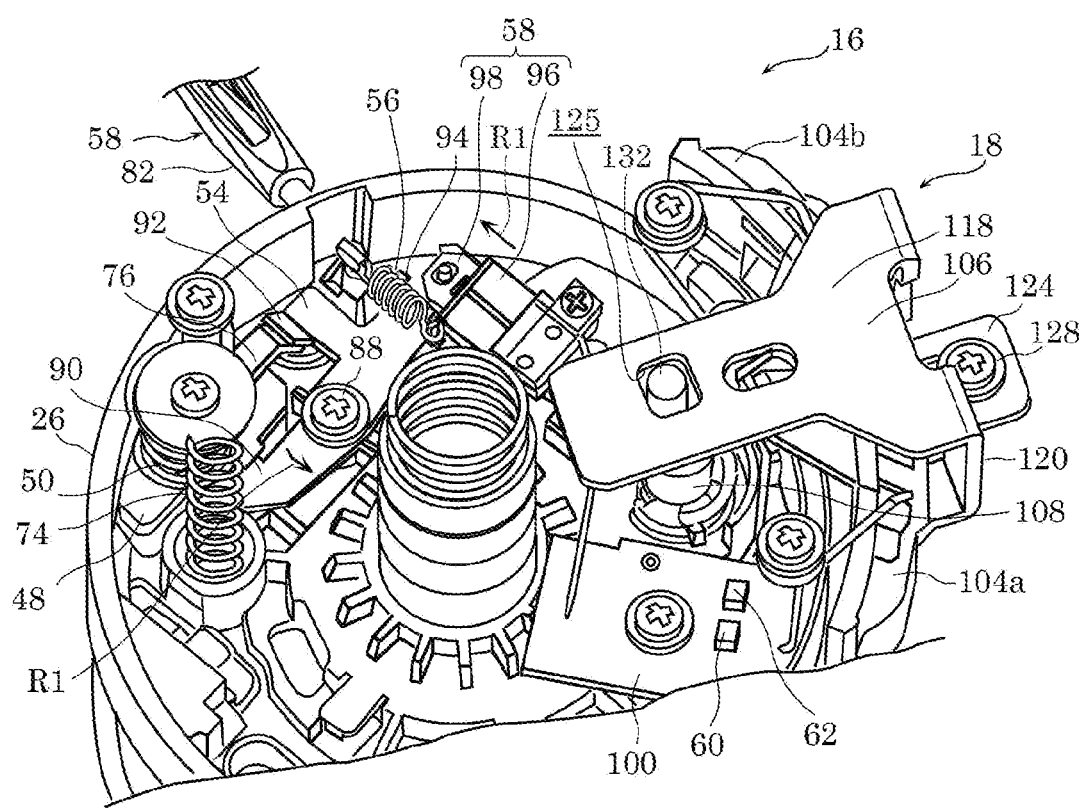
FIG. 13 is a perspective view illustrating a lifter mechanism according to an embodiment when viewed at an angle (from below) different from that in FIG. 11.

FIG. 11 is a perspective view illustrating lifter mechanism 16 according to the embodiment with mounting pedestal 42 in a lowered position. FIG. 12 is a perspective view illustrating lifter mechanism 16 according to an embodiment when viewed at an angle (from below) different from that in FIG. 11. FIG. 13 is a perspective view illustrating lifter mechanism 16 according to an embodiment when viewed at an angle (from below) different from that in FIG. 11.

Note that for illustrative purposes, illustrations of rotating mechanism 22, arm 24, second supporting base 28, handle ring 30, etc., are omitted in FIG. 6 to FIG. 13.

As illustrated in FIG. 6 to FIG. 10, lifter mechanism 16 includes mounting pedestal 42, first lifter 44, damper mechanism 46, second lifter 48, first biasing member 50, queueing lever 52, locking lever 54, second biasing member 56, holding member 58, detector 60, and controller 62.

As illustrated in FIG. 6 and FIG. 11, mounting pedestal 42 is for mounting a predetermined portion (a portion located between head-shell 34 and rotating mechanism 22) of arm 24 and is formed in the shape of an arc. Mounting pedestal 42 is connected to an upper end portion of each of a pair of support columns 64, 66. A lower end portion of one support column 64 is supported on first supporting base 26 in such a manner as to be capable of moving up and down. A lower end portion of the other support column 66 is fixed to the topside of first lifter 44. This means that mounting pedestal 42 is coupled to first lifter 44 via support column 66. This allows mounting pedestal 42 to be raised and lowered between the lowered position (refer to FIG. 4 and FIG. 11) and the raised position (refer to FIG. 5 and FIG. 6) in conjunction with the upward and downward movement of first lifter 44 to be described later. Specifically, as indicated by arrow P2 in FIG. 4, mounting pedestal 42 is lowered from the raised position to the lowered position in conjunction with the downward movement of first lifter 44. As indicated by arrow P1 in FIG. 5, mounting pedestal 42 is raised from the lowered position to the raised position in conjunction with the raising movement of first lifter 44.

To play phonograph record 4, as illustrated in FIG. 4, mounting pedestal 42 with arm 24 mounted thereon is lowered from the raised position to the lowered position, and thus arm 24 is rotated downward in conjunction with the downward movement of mounting pedestal 42, resulting in head-shell 34 approaching phonograph record 4 on turntable 8. Accordingly, the record needle of cartridge 36 traces the groove of phonograph record 4.

On the other hand, to stop the playing of phonograph record 4, as illustrated in FIG. 5, mounting pedestal 42 is raised from the lowered position to the raised position, and thus arm 24 is rotated upward in conjunction with the upward movement of mounting pedestal 42, resulting in head-shell 34 being detached from phonograph record 4 on turntable 8.

As illustrated in FIG. 6 to FIG. 8, first lifter 44 is for supporting the predetermined portion of arm 24 from below via mounting pedestal 42 and is formed in the shape of a plate. First lifter 44 is disposed above first supporting base 26 and is supported in such a manner as to be capable of moving up and down with respect to first supporting base 26. First lifter 44 is raised and lowered between the first lower limit position (refer to FIG. 11) and the first upper limit position (refer to FIG. 6) located higher than the first lower limit position.

First lifter 44 is coupled to mounting pedestal 42 via support column 66. With this, when first lifter 44 is lowered from the first upper limit position to the first lower limit position, mounting pedestal 42 is lowered from the raised position to the lowered position in conjunction with the downward movement of first lifter 44. On the other hand, when first lifter 44 is raised from the first lower limit position to the first upper limit position, mounting pedestal 42 is raised from the lowered position to the raised position in conjunction with the upward movement of first lifter 44. As illustrated in FIG. 8, interlocking rod 68 extending downward to second lifter 48 is attached to the underside of first lifter 44.

Damper mechanism 46 is for applying a braking force against the downward movement of first lifter 44 (that is, a force exerted against the downward movement of first lifter 44) when first lifter 44 is lowered from the first upper limit position to the first lower limit position. As illustrated in FIG. 7 and FIG. 8, damper mechanism 46 includes pinion 70, rack 72, and coil spring 74. Pinion 70 is rotatably supported on first supporting base 26. Rack 72 extends downward from first lifter 44 and meshes with pinion 70.

Coil spring 74 is disposed inside arm base 20 and biases first lifter 44 from the first upper limit position toward the first lower limit position.

As described later, when queueing lever 52 pushes down second lifter 48 from the second upper limit position to the second lower limit position, first lifter 44 is lowered from the first upper limit position to the first lower limit position at a lowering speed less than the lowering speed of second lifter 48 while receiving the braking force of damper mechanism 46. This allows the record needle of cartridge 36 on arm 24 to gradually approach phonograph record 4.

As illustrated in FIG. 8, second lifter 48 is for supporting first lifter 44 from below and is formed in the shape of a plate. Second lifter 48 is disposed inside first supporting base 26 and is supported in such a manner as to be capable of moving up and down with respect to first supporting base 26. Second lifter 48 is raised and lowered between the second lower limit position (refer to FIG. 12 and FIG. 13) and the second upper limit position (refer to FIG. 9 and FIG. 10) located higher than the second lower limit position. A lower end portion of interlocking rod 68 on first lifter 44 is in contact with the topside of second lifter 48. Note that second lifter 48 and the lower end portion of interlocking rod 68 on first lifter 44 can be detached from each other.

When second lifter 48 moves from the second lower limit position to the second upper limit position, first lifter 44 is pushed up by second lifter 48 via interlocking rod 68 and thus is raised from the first lower limit position to the first upper limit position in conjunction with the upward movement of second lifter 48. In the case where the lowering speed of second lifter 48 is greater than the lowering speed of first lifter 44, when second lifter 48 is lowered from the second upper limit position to the second lower limit position, first lifter 44 starts lowering slightly later than the downward movement of second lifter 48 due to damper mechanism 46 and thus is lowered from the first upper limit position to the first lower limit position. At this time, second lifter 48 is detached from the lower end portion of interlocking rod 68 on first lifter 44.

Furthermore, as illustrated in FIG. 8 and FIG. 10, abutting piece 76 extending toward cam piece 92 (to be described later) of locking lever 54 is formed on second lifter 48. Moreover, as illustrated in FIG. 6 and FIG. 8, pressing piece 78 extending toward second cam portion 86 (to be described later) of queueing lever 52 is formed on second lifter 48. Note that as illustrated in FIG. 6, an upper end portion of pressing piece 78 protrudes upward from the topside of first supporting base 26.

First biasing member 50 is for biasing second lifter 48 from the second lower limit position toward the second upper limit position and includes, for example, a coil spring. As illustrated in FIG. 8 to FIG. 10, first biasing member 50 is disposed inside first supporting base 26.

Queueing lever 52 is for manually pushing down second lifter 48 from the second upper limit position to the second lower limit position. As illustrated in FIG. 6 and FIG. 7, queueing lever 52 is rotatably supported on the topside of first supporting base 26. Queueing lever 52 includes second rotation shaft portion 80, handle portion 82, first cam portion 84, and second cam portion 86. Second rotation shaft portion 80 is disposed horizontally and supports queueing lever 52 in such a manner as to allow queueing lever 52 to rotate in a first operation direction (the direction indicated by arrow S1 in FIG. 6) and a second operation direction (the direction indicated by arrow S2 in FIG. 11) opposite to the first operation direction. Handle portion 82 is provided at one end portion of second rotation shaft portion 80 and extends substantially perpendicularly with respect to the axial direction (horizontal direction) of second rotation shaft portion 80. First cam portion 84 is provided at the other end portion of second rotation shaft portion 80 and disposed in such a manner as to be engageable with the underside of first lifter 44. Second cam portion 86 is provided closer to one end portion of second rotation shaft portion 80 than first cam portion 84 is, and is disposed in such a manner as to be engageable with the upper end portion of pressing piece 78 on second lifter 48.

As described later, when a user rotates queueing lever 52 in the first operation direction by holding handle portion 82 with his or her hand fingers in the state where holding member 58 is not holding locking lever 54 in the locked position, second cam portion 86 pushes down the upper end portion of pressing piece 78 on second lifter 48. Accordingly, second lifter 48 is pushed down from the second upper limit position to the second lower limit position.

Locking lever 54 is for locking second lifter 48 in the second lower limit position. As illustrated in FIG. 8 to FIG. 10, locking lever 54 is rotatably (one example of the displacement) disposed in first supporting base 26. Locking lever 54 includes first rotation shaft portion 88, engaging piece 90, cam piece 92, and coupling piece 94. First rotation shaft portion 88 supports locking lever 54 in such a manner as to allow locking lever 54 to rotate between a locked position (refer to FIG. 12 and FIG. 13) and a released position (refer to FIG. 9 and FIG. 10). Engaging piece 90 extends from first rotation shaft portion 88 and is disposed in such a manner as to be engageable with the topside of second lifter 48. Cam piece 92 extends from first rotation shaft portion 88 and is disposed in such a manner as to be abuttable against abutting piece 76 on second lifter 48. Coupling piece 94 is coupled to actuating portion 98 (to be described later) of holding member 58.

As illustrated in FIG. 12 and FIG. 13, in the state where locking lever 54 is located at the locked position, the tip portion of engaging piece 90 is in engagement with the topside of second lifter 48 located at the second lower limit position. Thus, second lifter 48 is locked in the second lower limit position against the biasing force of first biasing member 50. In this state, when locking lever 54 rotates from the locked position to the released position, the tip portion of engaging piece 90 is detached from the topside of second lifter 48 located at the second lower limit position, as illustrated in FIG. 9 and FIG. 10. Thus, second lifter 48 is raised from the second lower limit position to the second upper limit position by the biasing force of first biasing member 50.

Second biasing member 56 is for biasing locking lever 54 from the locked position toward the released position and includes, for example, a coil spring. As illustrated in FIG. 9 to FIG. 10, second biasing member 56 is disposed inside first supporting base 26.

Holding member 58 is for holding locking lever 54 in the locked position and includes, for example, a latching solenoid. As illustrated in FIG. 9 and FIG. 10, holding member 58 is disposed in first supporting base 26. Holding member 58 includes body portion 96 and actuating portion 98 disposed in body portion 96 in such a manner as to be capable of back and forth movement and coupled to coupling piece 94 of lock lever 54. Actuating portion 98 can move between a withdrawal position (refer to FIG. 12 and FIG. 13) at which actuating portion 98 is withdrawn into body portion 96 and a protrusion position (refer to FIG. 9 and FIG. 10) at which actuating portion 98 protrudes from body portion 96. As illustrated in FIG. 12 and FIG. 13, in the state where actuating portion 98 is held in the withdrawal position by magnetism, locking lever 54 is held in the locked position against the biasing force of second biasing member 56. In this state, when holding member 58 is energized only for a predetermined length of time (for example, a few milliseconds), the force of holding actuating portion 98 in the withdrawal position is weakened (or lost) due to weakening (or loss) of the magnetism, and thus the hold of locking lever 54 is released from the locked position. Accordingly, locking lever 54 rotates from the locked position to the released position by the biasing force of second biasing member 56, and actuating portion 98 moves from the withdrawal position to the protrusion position.

Detector 60 is a sensor for detecting that head-shell 34 on arm 24 is located at a play end position (one example of the predetermined position) on the face of phonograph record 4 and includes, for example, a photo-interrupter. As illustrated in FIG. 10, detector 60 is mounted on substrate 100 disposed in first supporting base 26. When head-shell 34 on arm 24 is located at the play end position on the face of phonograph record 4, a light-blocking piece (not illustrated in the drawings) extending downward from arm 24 blocks an optical detection path of detector 60, and thus detector 60 outputs a detection signal to controller 62.

Controller 62 is for controlling energization of holding member 58. As illustrated in FIG. 10, controller 62 is mounted on substrate 100 disposed in first supporting base 26. On the basis of the detection signal from detector 60, controller 62 energizes holding member 58 for the predetermined length of time mentioned above and thus causes holding member 58 to release the hold of locking lever 54 from the locked position.

[2-3-2. Movement of Lifter Mechanism]

Figure 14:
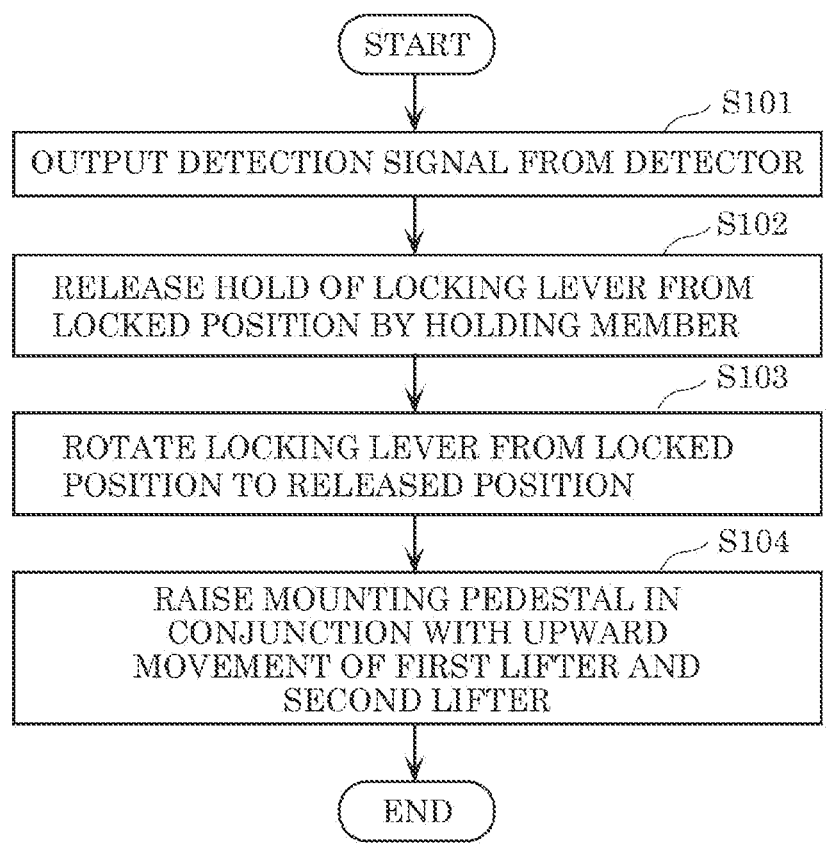
FIG. 14 is a flowchart illustrating the flow of upward movement of a mounting pedestal in a lifter mechanism according to an embodiment.

Next, with reference to FIG. 5, FIG. 6, FIG. 10, FIG. 11, FIG. 13, and FIG. 14, the upward movement of mounting pedestal 42 in lifter mechanism 16 according to the embodiment will be described. FIG. 14 is a flowchart illustrating the flow of the upward movement of mounting pedestal 42 in lifter mechanism 16 according to the embodiment.

As illustrated in FIG. 14, when head-shell 34 on arm 24 is located at the play end position on the face of phonograph record 4, detector 60 outputs the detection signal to controller 62 (S101). On the basis of the detection signal from detector 60, controller 62 energizes holding member 58 only for the predetermined length of time mentioned above. Accordingly, the hold of locking lever 54 in the locked position by holding member 58 is released (S102), and as indicated by arrow R1 in FIG. 13, locking lever 54 rotates from the locked position to the released position by the biasing force of second biasing member 56 (S103).

As illustrated in FIG. 10, when locking lever 54 is located at the released position, second lifter 48 is raised from the second lower limit position to the second upper limit position by the biasing force of first biasing member 50. Furthermore, as indicated by arrow Q1 in FIG. 11, first lifter 44 is raised from the first lower limit position to the first upper limit position in conjunction with the upward movement of second lifter 48. Accordingly, as indicated by arrow P1 in FIG. 5 and FIG. 11, mounting pedestal 42 is raised from the lowered position to the raised position in conjunction with the upward movement of first lifter 44 and second lifter 48 (S104). At this time, first lifter 44 receives the braking force of damper mechanism 46 even during the upward movement, and thus second lifter 48 and mounting pedestal 42 is gradually raised in conjunction with the upward movement of first lifter 44. As a result, first lifter 44 is brought to the first upper limit position and mounting pedestal 42 is brought to the raised position, as illustrated in FIG. 6. At this time, although not illustrated in the drawings, second lifter 48 is brought to the second upper limit position. As indicated by arrow V1 in FIG. 5, arm 24 rotates upward in conjunction with the upward movement of mounting pedestal 42. Note that as pressing piece 78 on second lifter 48 pushes up second cam portion 86, queueing lever 52 rotates in the second operation direction as indicated by arrow S2 in FIG. 11.

Note that the present embodiment describes the case where mounting pedestal 42 is automatically raised at the end of the playing, but mounting pedestal 42 can be manually raised by a user, for example, as follows. In the state where holding member 58 is holding locking lever 54 in the locked position, a user manually rotates queueing lever 52 in the second operation direction, and thus first cam portion 84 pushes up first lifter 44 from the first lower limit position to the first upper limit position. Accordingly, mounting pedestal 42 is raised from the lowered position to the raised position in conjunction with the upward movement of first lifter 44. Subsequently, in the state where holding member 58 is holding locking lever 54 in the locked position, the user manually rotates queueing lever 52 in the first operation direction, and thus first cam portion 84 is detached from the underside of first lifter 44. Accordingly, first lifter 44 is lowered from the first upper limit position to the first lower limit position, and mounting pedestal 42 is lowered from the raised position to the lowered position in conjunction with the downward movement of first lifter 44. In this manner, a user can raise and lower mounting pedestal 42 by operating queueing lever 52 in the state where second lifter 48 is locked in the second lower limit position by locking lever 54.

Figure 15:
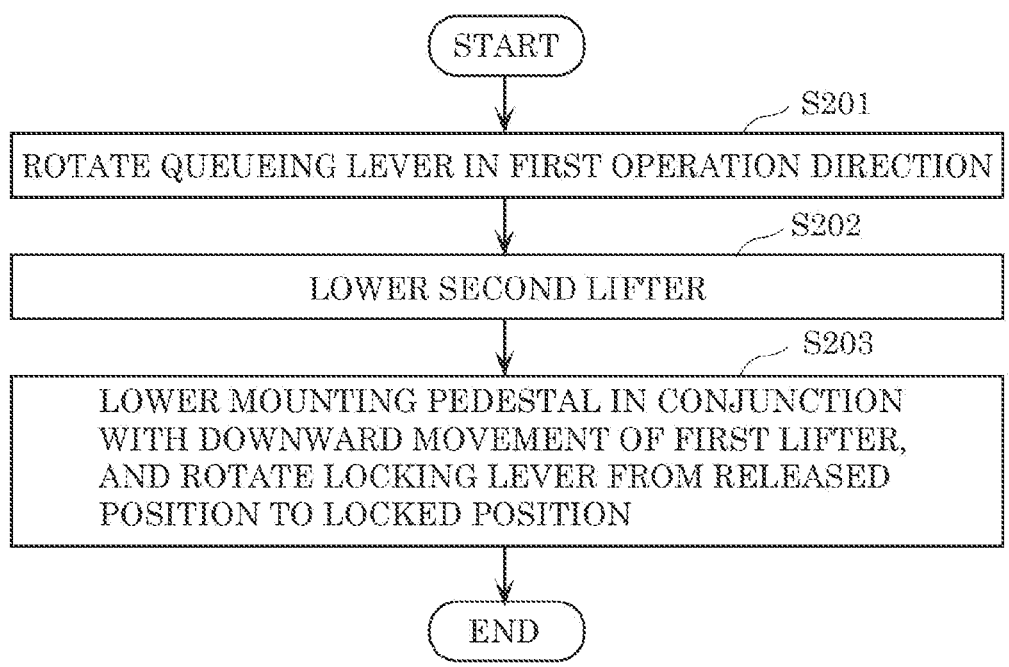
FIG. 15 is a flowchart illustrating the flow of downward movement of a mounting pedestal in a lifter mechanism according to an embodiment.

Next, with reference to FIG. 4, FIG. 6, FIG. 10, FIG. 11, FIG. 13, and FIG. 15, the downward movement of mounting pedestal 42 in lifter mechanism 16 according to the embodiment will be described. FIG. 15 is a flowchart illustrating the flow of the downward operation of mounting pedestal 42 in lifter mechanism 16 according to the embodiment.

As illustrated in FIG. 15, to start playing phonograph record 4, for example, a user rotates queueing lever 52 in the first operation direction as indicated by arrow S1 in FIG. 6 (S201). Accordingly, second cam portion 86 of queueing lever 52 pushes down pressing piece 78 on second lifter 48, and therefore second lifter 48 is lowered from the second upper limit position to the second lower limit position by the biasing force of first biasing member 50 (S202). Furthermore, as indicated by arrow Q2 in FIG. 6, first lifter 44 is lowered from the first upper limit position to the first lower limit position slightly later than the downward movement of second lifter 48 due to damper mechanism 46. As indicated by arrow P2 in FIG. 4 and FIG. 6, mounting pedestal 42 is lowered from the raised position to the lowered position in conjunction with the downward movement of first lifter 44 (S203). As a result, first lifter 44 is brought to the first lower limit position and mounting pedestal 42 is brought to the lowered position, as illustrated in FIG. 11. At this time, although not illustrated in the drawings, second lifter 48 is brought to the second lower limit position. As indicated by arrow V2 in FIG. 4, arm 24 rotates downward in conjunction with the downward movement of mounting pedestal 42.

As second lifter 48 is lowered from the second upper limit position to the second lower limit position, abutting piece 76 on second lifter 48 abuts cam piece 92 of locking lever 54, and thus locking lever 54 rotates from the released position to the locked position as indicated by arrow R2 in FIG. 10 (S203). At this time, actuating portion 98 of holding member 58 moves from the protrusion position to the withdrawal position and is held in the withdrawal position by magnetism, allowing holding member 58 to hold locking lever 54 in the locked position as illustrated in FIG. 13. Thus, second lifter 48 is locked in the second lower limit position by locking lever 54. [2-4. Configuration and Movement of Raising and Lowering Mechanism]

Figure 16:
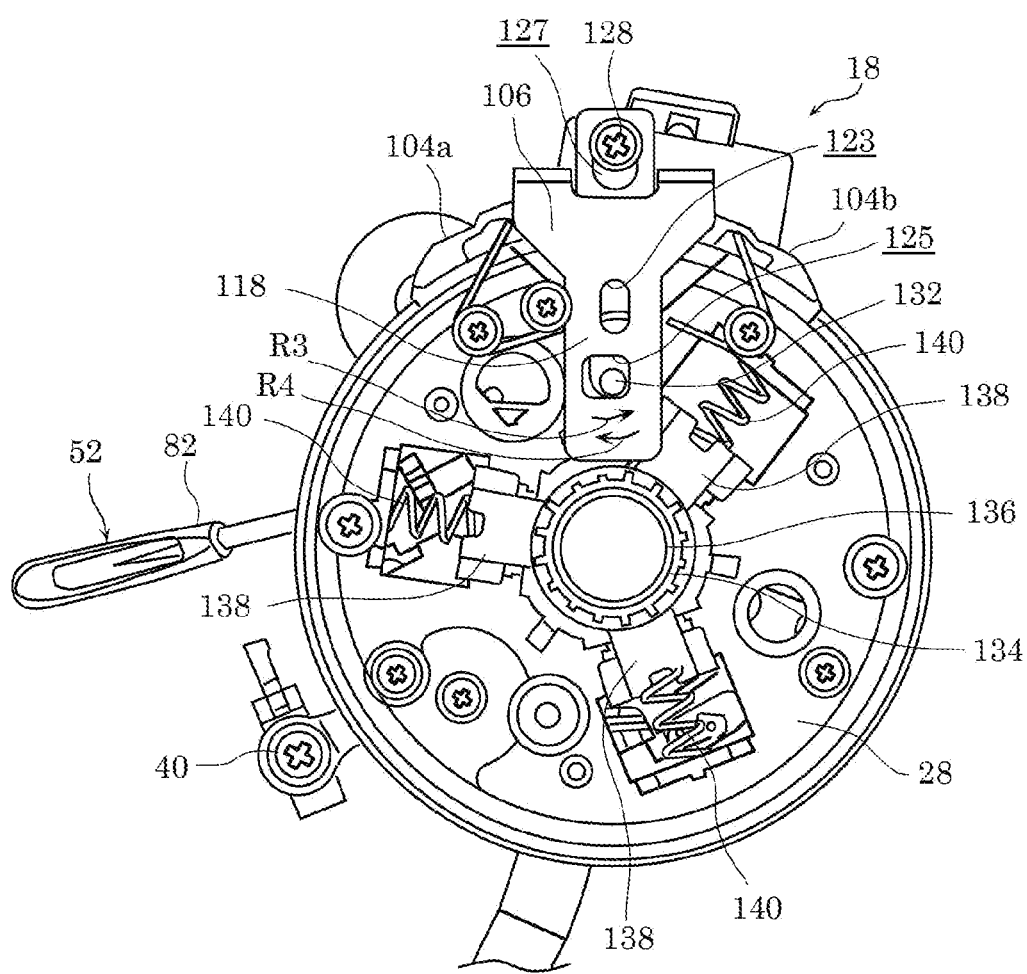
FIG. 16 is a plan view illustrating a raising and lowering mechanism according to an embodiment.
Figure 17:
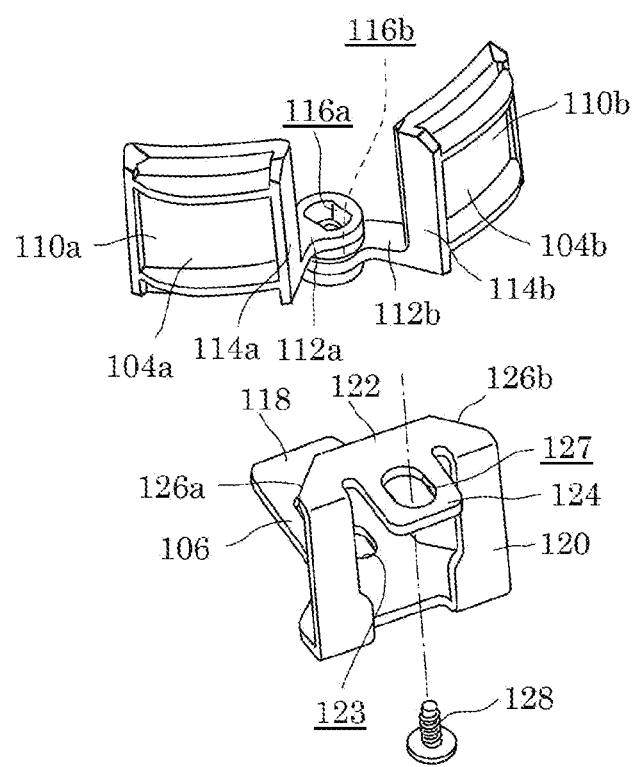
FIG. 17 is an exploded perspective view illustrating a portion of a raising and lowering mechanism according to an embodiment.

Next, with reference to FIG. 1, FIG. 3, FIG. 7, FIG. 9, FIG. 16, and FIG. 17, the configuration of raising and lowering mechanism 18 according to the embodiment will be described. FIG. 16 is a plan view illustrating raising and lowering mechanism 18 according to the embodiment. FIG. 17 is an exploded perspective view illustrating a portion of raising and lowering mechanism 18 according to the embodiment.

As illustrated in FIG. 1, FIG. 3, FIG. 7, and FIG. 9, raising and lowering mechanism 18 includes arm base mount 102 (refer to FIG. 1), a pair of locking supports 104a, 104b (one example of the contacting member), locking plate 106, and locking shaft 108 (one example of the operating member).

As illustrated in FIG. 1, arm base mount 102 is disposed in casing 6. Arm base mount 102 is formed in the shape of a bottomed cylinder and used for supporting arm base 20 in such a manner as to allow arm base 20 to move upward and downward. Arm base mount 102 is disposed so as to cover the outer peripheral surface and the bottom surface of second supporting base 28 of arm base 20. A supporting cylinder portion (not illustrated in the drawings) in the shape of a circular cylinder for insertion of center shaft 134 of arm base 20 is formed at a central portion of the bottom surface of arm base mount 102. Note that as illustrated in FIG. 3, center shaft 134 is formed in the shape of a circular cylinder and extends downward from the bottom surface of second supporting base 28. Third biasing member 136 for biasing arm base 20 in a direction to raise arm base 20 with respect to arm base mount 102 is disposed in the supporting cylinder portion of arm base mount 102. Third biasing member 136 includes, for example, a coil spring.

As illustrated in FIG. 3, FIG. 7, FIG. 8, FIG. 9, and FIG. 16, the pair of locking supports 104a, 104b are members that are movably attached to arm base mount 102 and are used for locking the upward and downward movement of arm base 20 with respect to arm base mount 102 by contacting ring rubber 32. Note that the pair of locking supports 104a, 104b are formed of a resin, for example.

As illustrated in FIG. 17, locking support 104a includes support body portion 110a and attaching piece 112a. Support body portion 110a is formed in the shape of a plate and is curved along the circumferential direction of the outer peripheral surface of second supporting base 28. Inclined surface 114a is formed on one lateral side of support body portion 110a. Attachment piece 112a extends from the concave surface side of support body portion 110a. Elongated hole 116a is formed in attachment piece 112a.

As illustrated in FIG. 17, locking support 104b is formed laterally mirrored with locking support 104a described above. Specifically, locking support 104b includes support body portion 110b and attachment piece 112b. Support body portion 110b is formed in the shape of a plate and is curved along the circumferential direction of the outer peripheral surface of second supporting base 28. Inclined surface 114b is formed on one lateral side of support body portion 110b. Attachment piece 112b extends from the concave surface side of support body portion 110b. Elongated hole 116b is formed in attachment piece 112b.

Although not illustrated in the drawings, the pair of locking supports 104a, 104b are disposed on a side wall portion (not illustrated in the drawings) of arm base mount 102 and adjacent to each other in such a manner that respective attaching pieces 112a, 112b face each other. As illustrated in FIG. 3, the concave surface sides of respective support body portions 110a, 110b of the pair of locking supports 104a, 104b are located facing ring rubber 32.

Furthermore, a protrusion (not illustrated in the drawings) formed on the bottom surface of arm base mount 102 is movably inserted in respective elongated holes 116a, 116b of attachment pieces 112a, 112b. This allows each of the pair of locking supports 104a, 104b to move between a non-contact position in which support body portions 110a, 110b separate from ring rubber 32 (in other words, arm base 20) and a contact position in which support body portions 110a, 110b contact ring rubber 32 (in other words, arm base 20).

Locking plate 106 is a member for pushing each of the pair of locking supports 104a, 104b from the non-contact position to the contact position. Note that locking plate 106 is formed from a metal such as iron, for example. As illustrated in FIG. 17, locking plate 106 includes horizontal portion 118, vertical portion 120, pusher portion 122, and attachment portion 124.

As illustrated in FIG. 9 and FIG. 17, horizontal portion 118 has: elongated hole 123 in which the protrusion (not illustrated in the drawings) on arm base mount 102 is movably inserted; and hole 125 in which eccentric shaft 132 (to be described later) of locking shaft 108 is rotatably inserted. As illustrated in FIG. 17, vertical portion 120 extends from one end portion of horizontal portion 118 substantially perpendicularly with respect to horizontal portion 118. Pusher portion 122 is formed at one end portion of vertical portion 120 and extends substantially perpendicularly with respect to vertical portion 120. A pair of inclined portions 126a, 126b are formed at both end portions of pusher portion 122. Attachment portion 124 extends from a central portion of pusher portion 122 in a direction substantially parallel to horizontal portion 118. Elongated hole 127 for insertion of screw 128 is formed in attachment portion 124.

As a result of screw 128 being screwed into a screw hole (not illustrated in the drawings) formed in arm base mount 102 through elongated hole 127 of attachment portion 124, locking plate 106 is attached to arm base mount 102. At this time, there is clearance between screw 128 and elongated hole 127, and therefore locking plate 106 can reciprocate in the radial direction of arm base mount 102. The protrusion (not illustrated in the drawings) on arm base mount 102 is movably inserted in elongated hole 123 of horizontal portion 118. The pair of inclined portions 126a, 126b of pusher portion 122 are respectively in contact with inclined surfaces 114a, 114b of support body portions 110a, 110b of the pair of locking supports 104a, 104b.

Locking shaft 108 is a member for moving each of the pair of locking supports 104a, 104b between the non-contact position and the contact position. As illustrated in FIG. 7, locking shaft 108 is formed in an elongated shape and disposed vertically penetrating arm base 20. Locking shaft 108 is rotatable about the vertically extending central axis thereof with respect to arm base 20.

As illustrated in FIG. 7, locking knob 130 is formed on an upper end portion of locking shaft 108. Locking knob 130 protrudes upward from the topside of arm base 20. A user can rotate locking shaft 108 with respect to arm base 20 by pinching locking knob 130 with his or her hand fingers. As illustrated in FIG. 3, FIG. 8, and FIG. 9, eccentric shaft 132 having a center offset from the central axis of locking shaft 108 is formed on a lower end portion of locking shaft 108.

As illustrated in FIG. 9, eccentric shaft 132 is rotatably inserted in hole 125 of horizontal portion 118 of locking plate 106.

Furthermore, as illustrated in FIG. 16, a plurality of blocks 138 and a plurality of coil springs 140 for biasing the plurality of blocks 138 toward the outer peripheral surface of the supporting cylinder portion (not illustrated in the drawings) of arm base mount 102 are disposed on the bottom surface of second supporting base 28 of arm base 20. By the biasing force of the plurality of coil springs 140, the plurality of blocks 138 are pressed against the outer peripheral surface of the supporting cylinder portion of arm base mount 102.

The following describes the movement of raising and lowering mechanism 18 mentioned above. To lower or raise arm 24 with respect to phonograph record 4, a user rotates locking shaft 108 with respect to arm base 20 in a predetermined direction by pinching locking knob 130 with his or her hand fingers. This allows eccentric shaft 132 to rotate about the central axis of locking shaft 108 in the direction indicated by arrow R3 in FIG. 16. At this time, eccentric shaft 132 is pressed against a peripheral portion of hole 125 of horizontal portion 118 of locking plate 106, and thus locking plate 106 moves away from the pair of locking supports 104a, 104b. Accordingly, each of the pair of locking supports 104a, 104b moves from the contact position to the non-contact position, and therefore a user can raise and lower arm base 20 with respect to arm base mount 102 by holding handle ring 30 with his or her hand fingers. By raising and lowering arm base 20 in this manner, it is possible to raise and lower arm 24 with respect to phonograph record 4.

By raising and lowering arm 24 with respect to phonograph record 4 as described above, it is possible to adjust the height of arm 24 relative to phonograph record 4. Thus, the substantially horizontal attitude of arm 24 can be maintained when the record needle is tracing the groove of phonograph record 4, and it is possible to accurately pick up the audio signal from phonograph record 4.

Note that as described above, third biasing member 136 biases arm base 20 in a direction to raise arm base 20 with respect to arm base mount 102, and the plurality of blocks 138 are pressed against the outer peripheral surface of the supporting cylinder portion of arm base mount 102; thus, when a user releases his or her hand fingers from handle ring 30, arm base 20 does not fall by itself with respect to arm base mount 102.

On the other hand, to lock the upward and downward movement of arm base 20 with respect to arm base mount 102 after the height of arm 24 relative to phonograph record 4 is adjusted, a user rotates locking shaft 108 with respect to arm base 20 in the direction opposite to the predetermined direction by pinching locking knob 130 with his or her hand fingers. This allows eccentric shaft 132 to rotate about the central axis of locking shaft 108 in the direction indicated by arrow R4 in FIG. 16. At this time, eccentric shaft 132 is pressed against a peripheral portion of hole 125 of horizontal portion 118 of locking plate 106, and thus locking plate 106 moves toward the pair of locking supports 104a, 104b. Accordingly, the pair of inclined portions 126a, 126b of pusher portion 122 respectively push inclined surfaces 114a, 114b of support body portions 110a, 110b of the pair of locking supports 104a, 104b, and thus the pair of locking supports 104a, 104b move from the non-contact position to the contact position.

In the state where each of the pair of locking supports 104a, 104b is located at the contact position, respective support body portions 110a, 110b of the pair of locking supports 104a, 104b are in contact with ring rubber 32. Thus, the upward and downward movement of arm base 20 with respect to arm base mount 102 is locked by a frictional force generated between ring rubber 32 and support body portions 110a, 110b.

[3. Advantageous Effects]

As described above, in the present embodiment, tonearm device 12 is used in reproduction device 2 for playing phonograph record 4. Tonearm device 12 includes: arm 24 that has a tip portion to which cartridge 36 is attached and that is supported to be rotatable downward to move the tip portion toward phonograph record 4 and be rotatable upward to move the tip portion away from phonograph record 4; and lifter mechanism 16 that rotates arm 24 downward and upward. Lifter mechanism 16 includes: first lifter 44 that supports arm 24 from below and is raised and lowered between the first lower limit position and the first upper limit position located higher than the first lower limit position; second lifter 48 that supports first lifter 44 from below and is raised and lowered between the second lower limit position and the second upper limit position located higher than the second lower limit position; first biasing member 50 that biases second lifter 48 from the second lower limit position toward the second upper limit position; locking lever 54 that is displaced between a locked position in which locking lever 54 locks second lifter 48 in the second lower limit position and a released position in which locking lever 54 releases the lock of second lifter 48 from the second lower limit position; second biasing member 56 that biases locking lever 54 from the locked position toward the released position; holding member 58 that holds locking lever 54 in the locked position; and queueing lever 52 that pushes down second lifter 48 from the second upper limit position to the second lower limit position. When holding member 58 releases the hold of locking lever 54 from the locked position, locking lever 54 rotates (is displaced) from the locked position to the released position by the biasing force of second biasing member 56, second lifter 48 is raised from the second lower limit position to the second upper limit position by the biasing force of first biasing member 50, first lifter 44 is raised from the first lower limit position to the first upper limit position in conjunction with the upward movement of second lifter 48, and arm 24 rotates upward in conjunction with the upward movement of first lifter 44. When queueing lever 52 pushes down second lifter 48 from the second upper limit position to the second lower limit position, second lifter 48 abuts locking lever 54, locking lever 54 rotates (is displaced) from the released position to the locked position, first lifter 44 is lowered from the first upper limit position to the first lower limit position, and arm 24 rotates downward in conjunction with the downward movement of first lifter 44.

Thus, first lifter 44 is raised in conjunction with the upward movement of second lifter 48 by the biasing force of first biasing member 50, making it possible to simplify the structure of lifter mechanism 16 as compared to the lifter mechanism using the motor described in the BACKGROUND ART section. As a result, lifter mechanism 16 can be downsized.

Furthermore, in the present embodiment, arm 24 is further supported so as to be rotatable along the face of phonograph record 4 in a substantially horizontal direction. Lifter mechanism 16 further includes: detector 60 that detects that the tip portion of arm 24 is located at a predetermined position on the face of phonograph record 4; and controller 62 that controls an operation of holding member 58 and causes, based on a detection signal from detector 60, holding member 58 to release the hold of locking lever 54 from the locked position.

Thus, when the tip portion of arm 24 is located at the predetermined position on the face of phonograph record 4, the hold of locking lever 54 in the locked position by holding member 58 can be automatically released.

Furthermore, in the present embodiment, holding member 58 includes a latching solenoid. Controller 62 energizes holding member 58 to cause holding member 58 to release the hold of locking lever 54 from the locked position.

Thus, controller 62 can easily control holding member 58.

Furthermore, in the present embodiment, locking lever 54 includes: first rotation shaft portion 88 that supports locking lever 54 in such a manner as to allow locking lever 54 to rotate between the locked position and the released position; engaging piece 90 extending from first rotation shaft portion 88 and disposed to be engageable with second lifter 48; and cam piece 92 extending from first rotation shaft portion 88 and disposed to be abuttable against second lifter 48. When holding member 58 is holding locking lever 54 in the locked position, engaging piece 90 is in engagement with second lifter 48 located at the second lower limit position. When holding member 58 releases the hold of locking lever 54 from the locked position, locking lever 54 rotates from the locked position to the released position, and engaging piece 90 separates from second lifter 48. When queueing lever 52 pushes down second lifter 48 from the second upper limit position to the second lower limit position, second lifter 48 abuts cam piece 92 of locking lever 54, locking lever 54 rotates from the released position to the locked position, and engaging piece 90 engages with second lifter 48.

Thus, engaging piece 90 of locking lever 54 engages with second lifter 48 located at the second lower limit position, and therefore it is possible to lock second lifter 48 in the second lower limit position with a relatively simple configuration. Furthermore, since second lifter 48 abuts cam piece 92 of locking lever 54, the rotation of locking lever 54 can be in conjunction with the downward movement of second lifter 48.

Furthermore, in the present embodiment, lifter mechanism 16 further includes damper mechanism 46 that applies a braking force against the downward movement of first lifter 44 when first lifter 44 is lowered from the first upper limit position to the first lower limit position. When queueing lever 52 pushes down second lifter 48 from the second upper limit position to the second lower limit position, first lifter 44 is lowered from the first upper limit position to the first lower limit position at a lowering speed less than the lowering speed of second lifter 48 due to damper mechanism 46.

Thus, first lifter 44 is lowered from the first upper limit position to the first lower limit position while receiving the braking force of damper mechanism 46, allowing the tip portion of arm 24 to gradually approach phonograph record 4. As a result, the playback of phonograph record 4 can be started smoothly.

Furthermore, in the present embodiment, queueing lever 52 includes: second rotation shaft portion 80 that supports queueing lever 52 in such a manner as to allow queueing lever 52 to rotate in the first operation direction and the second operation direction opposite to the first operation direction; first cam portion 84 provided on second rotation shaft portion 80 and engaging with first lifter 44; and second cam portion 86 provided on second rotation shaft portion 80 and engaging with second lifter 48. When queueing lever 52 rotates in the first operation direction in the state where holding member 58 is not holding locking lever 54 in the locked position, second cam portion 86 pushes down second lifter 48 from the second upper limit position to the second lower limit position. When queueing lever 52 rotates in the second operation direction in the state where holding member 58 is holding locking lever 54 in the locked position, first cam portion 84 pushes up first lifter 44 from the first lower limit position to the first upper limit position.

Thus, a user can manually push up first lifter 44 from the first lower limit position to the first upper limit position by rotating queueing lever 52 in the second operation direction.

Furthermore, in the present embodiment, tonearm device 12 further includes raising and lowering mechanism 18 that raises and lowers arm 24 with respect to phonograph record 4. Raising and lowering mechanism 18 includes: arm base 20 that supports arm 24 in such a manner as to allow arm 24 to rotate downward and upward; arm base mount 102 that supports arm base 20 in such a manner as to allow arm base 20 to move upward and downward; third biasing member 136 that biases arm base 20 in a direction to raise arm base 20 with respect to arm base mount 102; locking supports 104a, 104b capable of moving between a contact position in which locking supports 104a, 104b contact arm base 20 and a non-contact position in which locking supports 104a, 104b separate from arm base 20; and locking shaft 108 that moves locking supports 104a, 104b between the contact position and the non-contact position.

With this, it is possible to raise and lower arm 24 with respect to phonograph record 4 with a relatively simple configuration.

Furthermore, in the present embodiment, reproduction device 2 plays phonograph record 4. Reproduction device 2 includes: turntable 8 on which phonograph record 4 is placed; drive source 10 that rotates turntable 8; and above-described tonearm device 12 that picks up an audio signal from phonograph record 4 placed on turntable 8 that is rotating.

Thus, lifter mechanism 16 can be downsized.

Other Embodiments

As described above, the embodiment is presented as an exemplification of the technique disclosed in the present application. However, the technique in the present disclosure is not limited to the embodiment, and is also applicable to an embodiment obtained by carrying out modification, substitution, addition, omission, etc., as necessary. Furthermore, it is also possible to obtain a new embodiment by combining structural elements described in above embodiment.

Examples of other embodiments include the following.

In the above embodiment, locking lever 54 is configured to rotate between the locked position and the released position, but this is not limiting; for example, locking lever 54 may be configured to linearly move (one example of the displacement) between the locked position and the released position.

As described above, the embodiment is presented as an exemplification of the technique according to the present disclosure. The accompanying drawings and the detailed description are provided for this purpose.

Therefore, the structural elements described in the accompanying drawings and the detailed description may include not only structural elements essential to solving the problem, but also structural elements that are not essential to solving the problem in order to exemplify the aforementioned technique. As such, description of these non-essential structural elements in the accompanying drawings and the detailed description should not be taken to mean that these non-essential structural elements are essential.

Furthermore, since the foregoing embodiment is for exemplifying the technique according to the present disclosure, various modifications, substitutions, additions, omissions, and so on, can be carried out within the scope of the Claims or equivalents thereof.

INDUSTRIAL APPLICABILITY

The present disclosure can be applied to a tonearm device used in a reproduction device for playing a phonograph record.

The invention claimed is:

1. A tonearm device used in a reproduction device for playing a phonograph record, the tonearm device comprising:
   an arm having a tip portion and supported to be rotatable downward to move the tip portion toward the phonograph record and be rotatable upward to move the tip portion away from the phonograph record, the tip portion being a portion to which a cartridge is attached; and
   a lifter mechanism that rotates the arm downward and upward, wherein
   the lifter mechanism includes:
      a first lifter that supports the arm from below and is raised and lowered between a first lower limit position and a first upper limit position located higher than the first lower limit position;
      a second lifter that supports the first lifter from below and is raised and lowered between a second lower limit position and a second upper limit position located higher than the second lower limit position;
      a first biasing member that biases the second lifter from the second lower limit position toward the second upper limit position;
      a locking lever that is displaced between a locked position in which the locking lever locks the second lifter in the second lower limit position and a released position in which the locking lever releases the lock of the second lifter from the second lower limit position;
      a second biasing member that biases the locking lever from the locked position toward the released position;
      a holding member that holds the locking lever in the locked position; and
      a queueing lever that pushes down the second lifter from the second upper limit position to the second lower limit position,
   when the holding member releases the hold of the locking lever from the locked position, the locking lever is displaced from the locked position to the released position by a biasing force of the second biasing member, the second lifter is raised from the second lower limit position to the second upper limit position by a biasing force of the first biasing member, the first lifter is raised from the first lower limit position to the first upper limit position in conjunction with upward movement of the second lifter, and the arm rotates upward in conjunction with upward movement of the first lifter, and
   when the queueing lever pushes down the second lifter from the second upper limit position to the second lower limit position, the second lifter abuts the locking lever, the locking lever is displaced from the released position to the locked position, the first lifter is lowered from the first upper limit position to the first lower limit position, and the arm rotates downward in conjunction with downward movement of the first lifter.

2. The tonearm device according to claim 1, wherein
the arm is further supported to be rotatable along a face of the phonograph record in a substantially horizontal direction, and
the lifter mechanism further includes:
   a detector that detects that the tip portion of the arm is located at a predetermined position on the face of the phonograph record; and
   a controller that controls an operation of the holding member and causes, based on a detection signal from the detector, the holding member to release the hold of the locking lever from the locked position.

3. The tonearm device according to claim 2, wherein
the holding member includes a latching solenoid, and
the controller energizes the latching solenoid to cause the latching solenoid to release the hold of the locking lever from the locked position.

4. The tonearm device according to claim 1, wherein
the locking lever includes:
   a first rotation shaft portion that supports the locking lever to allow the locking lever to rotate between the locked position and the released position;
   an engaging piece extending from the first rotation shaft portion and disposed to be engageable with the second lifter; and
   a cam piece extending from the first rotation shaft portion and disposed to be abuttable against the second lifter,
when the holding member is holding the locking lever in the locked position, the engaging piece is in engagement with the second lifter located at the second lower limit position,
when the holding member releases the hold of the locking lever from the locked position, the locking lever rotates from the locked position to the released position, and the engaging piece separates from the second lifter, and
when the queueing lever pushes down the second lifter from the second upper limit position to the second lower limit position, the second lifter abuts the cam piece of the locking lever, the locking lever rotates from the released position to the locked position, and the engaging piece engages with the second lifter.

5. The tonearm device according to claim 1, wherein
the lifter mechanism further includes a damper mechanism that applies a braking force against the downward movement of the first lifter when the first lifter is lowered from the first upper limit position to the first lower limit position, and
when the queueing lever pushes down the second lifter from the second upper limit position to the second lower limit position, the first lifter is lowered from the first upper limit position to the first lower limit position at a lowering speed less than a lowering speed of the second lifter due to the damper mechanism.

6. The tonearm device according to claim 4, wherein
the queueing lever includes:
   a second rotation shaft portion that supports the queueing lever to allow the queueing lever to rotate in a first operation direction and a second operation direction opposite to the first operation direction;
   a first cam portion provided on the second rotation shaft portion and engaging with the first lifter; and a second cam portion provided on the second rotation shaft portion and engaging with the second lifter, when the queueing lever rotates in the first operation direction in a state where the holding member is not holding the locking lever in the locked position, the second cam portion pushes down the second lifter from the second upper limit position to the second lower limit position, and when the queueing lever rotates in the second operation direction in a state where the holding member is holding the locking lever in the locked position, the first cam portion pushes up the first lifter from the first lower limit position to the first upper limit position.

7. The tonearm device according to claim 1, further comprising:

a raising and lowering mechanism that raises and lowers the arm with respect to the phonograph record, wherein the raising and lowering mechanism includes:

an arm base that supports the arm to allow the arm to rotate downward and upward;

an arm base mount that supports the arm base to allow the arm base to move upward and downward;

a third biasing member that biases the arm base in a direction to raise the arm base with respect to the arm base mount;

a contacting member capable of moving between a contact position in which the contacting member contacts the arm base and a non-contact position in which the contacting member separates from the arm base; and an operating member that moves the contacting member between the contact position and the non-contact position.

8. A reproduction device for playing a phonograph record, the reproduction device comprising:

a turntable on which the phonograph record is placed;

a drive source that rotates the turntable; and the tonearm device according to claim 1 that picks up an audio signal from the phonograph record placed on the turntable that is rotating.

\* \* \* \* \*